United States Patent
Griffiths et al.

(10) Patent No.: US 7,644,401 B2
(45) Date of Patent: Jan. 5, 2010

(54) EXECUTABLE FILE CREATION (75) Inventors: Ian George Griffiths, Eastleigh (GB); Robert Harris, Christchruch (GB)

(73) Assignee: International Business Machines Corporation, Armonk, NY (US)

(*) Notice: Subject to any disclaimer, the term of this patent is extended or adjusted under 35 U.S.C. 154(b) by 158 days.

(21) Appl. No.: 10/554,323

(22) PCT Filed: Mar. 4, 2004

(86) PCT No.: PCT/GB2004/000910

§ 371 (c)(1),
(2), (4) Date: Jul. 13, 2006

(87) PCT Pub. No.: WO2004/095266

PCT Pub. Date: Nov. 4, 2004

(65) Prior Publication Data

US 2006/0265412 A1 Nov. 23, 2006

(30) Foreign Application Priority Data

Apr. 24, 2003 (GB) ................... 0309273.1

(51) Int. Cl.
*G06F 9/44* (2006.01)

(52) U.S. Cl. .............. 717/163; 717/106; 717/107; 717/162; 717/165

(58) Field of Classification Search .......... 717/162–167
See application file for complete search history.

(56) References Cited

U.S. PATENT DOCUMENTS

| | | | | |
|---|---|---|---|---|
| 5,966,702 A | * | 10/1999 | Fresko et al. | 707/1 |
| 6,349,344 B1 | * | 2/2002 | Sauntry et al. | 719/332 |
| 6,513,153 B1 | * | 1/2003 | Lee | 717/100 |
| 6,810,519 B1 | * | 10/2004 | Hicks | 717/166 |
| 7,017,148 B2 | * | 3/2006 | Kumar | 717/114 |
| 2003/0177483 A1 | * | 9/2003 | Southwell et al. | 717/162 |
| 2005/0114840 A1 | * | 5/2005 | Zeidman | 717/126 |

FOREIGN PATENT DOCUMENTS

EP 0913769 5/1999

* cited by examiner

*Primary Examiner*—Wei Y Zhen
*Assistant Examiner*—Matthew J Brophy
(74) *Attorney, Agent, or Firm*—Yee & Associates, P.C.; David A. Mims, Jr.

(57) ABSTRACT

The present invention provides a method, apparatus and computer program product for combining a plurality of run units into a single executable file. According the invention each run unit may contain one or more data entities which are designated as being required only once in an executable file. As a result when the executable file is built, if a run unit with a data entity of a given value is to be added to an executable file, if a previous run unit with a data entity with a matching value has previously been added to the executable file, the run unit is added to the executable file but without the data entity.

20 Claims, 4 Drawing Sheets

Fig. 2

EXECUTABLE FILE CREATION

FIELD OF THE INVENTION

The present invention relates to the creation of executable files and more particularly to combining a collection of files into a single executable file.

BACKGROUND TO THE INVENTION

In software programming, during the creation of an executable version of software it is normal practice to combine a plurality of files (run units) into a single larger executable file, for example when two or more object files are combined into a dynamic link library in a Microsoft™ Windows™ programming environment, or two or more class files are combined into a single jar file in the Java™ programming environment. Such a combination process is often known as link-editing (or deployment in the Java case). (Microsoft and Windows are trademarks of Microsoft Corporation in the United States, other countries, or both. Java and all Java-based trademarks are trademarks of Sun Microsystems, Inc. in the United States, other countries, or both).

When an executable file is created in this way it can be a requirement for two or more of the run units and the executable file to contain one or more data entities with a specific value. For example, in software organisations, whilst there is not a legal requirement, there is often an internal requirement that each run unit and executable file contain a readable copyright notice. This gives a fair notice to potential copyright infringers and can make copyright easier to enforce.

According to the prior art a data entity with such a specific value can be included in each run unit, for example, by including a static string set to a required value such as "Copyright IBM™ Corp. 2003". The static string then persists during the combination process and is therefore also present in the executable file. However, as a result of this process, whilst the internal requirement of the software organisation is met, if, for example, the executable file is created by combining 10 run units each containing such a static string, the executable file will contain 10 occurrences the static string, one for each run unit. This serves to increase the storage requirements of the executable file and whilst this adequately addresses the internal requirement in environments in which storage is not constrained and performance is not an issue, in other environments it can result in degraded performance, especially when a complex product can comprise many hundreds of run units. Such constrained environments occur, for example, in hand-held portable devices such as those providing mobile telephony (a celluar telephone) or handheld computers such as like personal organisers. (IBM is a registered trademark of IBM Corp. in the United States, other countries, or both).

SUMMARY OF THE INVENTION

According to a first aspect the present invention provides a data processing method for creating an executable file by combining a plurality of run units, the method comprising the steps of: reading a first run unit to be added to the executable file; locating a first data entity set to a first string value in the first run unit; matching the first data entity with a second data entity set to a second string value, the second data entity being from a second run unit previously added to the executable file; and adding the first run unit to the executable file but without the first data entity.

According to a second aspect the present invention provides a data processing apparatus for creating an executable file by combining a plurality of run units, the apparatus comprising: means for reading a first run unit to be added to the executable file; means for locating a first data entity set to a first string value in the first run unit; means for matching the first data entity with a second data entity set to a second string value, the second data entity being from a second run unit previously added to the executable file; and means for adding the first run unit to the executable file but without the first data entity.

According to a third aspect the present invention provides a computer program product comprising instructions which, when executed on a data processing host, cause the data processing host to carry out a method according to the first aspect.

Thus according to the present invention a data entity in a run unit is located and its contents are inspected such that when a plurality of run units are combined into a single executable file, a data entity is not added if a match is found with a data entity which is already in the executable file as a result of adding a previous run unit.

Optionally matching two data entities requires each to contain identical string values, for example a data entity to be added to the executable file and set to "abcdef" would only be matched with a data entity already in the executable file and set to "abcdef".

Alternatively matching two data entities requires a partial match in which the data entity already in the executable file contains the string value of the data entity to be added. For example a data entity to be added to the file and set to "bcde" would be matched with a data entity already in the executable file and set to "abcdef".

If matching only requires a partial match, optionally if a run unit to be added to the executable file contains a new data entity set to a string value which also contains the string value of a previously added data entity, the new data entity is added to the executable file and the previously added data entity is removed. For example if the new data entity is set to "abcdef" and the previously added data entity is set to "bcde" the new data entity replaces the previously added data entity in the executable file. This is because the "bcde" setting is a substring of the larger "abcdef" data entity. Observe that this matching is on the whole data entity, not just its prefix or suffix.

Optionally if a run unit to be added to the executable file contains a plurality of data entities, two or more of the data entities may be combined into a single data entity for matching with data entities already in the executable file.

Preferably a data entity in a run unit is marked with a key value which can then be used to locate the data entity. For example a data entity could be marked with a key value of "LEG".

Preferably the data entity contains a copyright notice. Alternatively it can contain any string, for example an author name or the name of the company which owns the executable file.

BRIEF DESCRIPTION OF THE DRAWINGS

The invention will now be described, by way of example only, with reference to a preferred embodiment thereof, as illustrated in the accompanying drawings, in which.

DESCRIPTION OF THE PREFERRED EMBODIMENT

Figure 1:
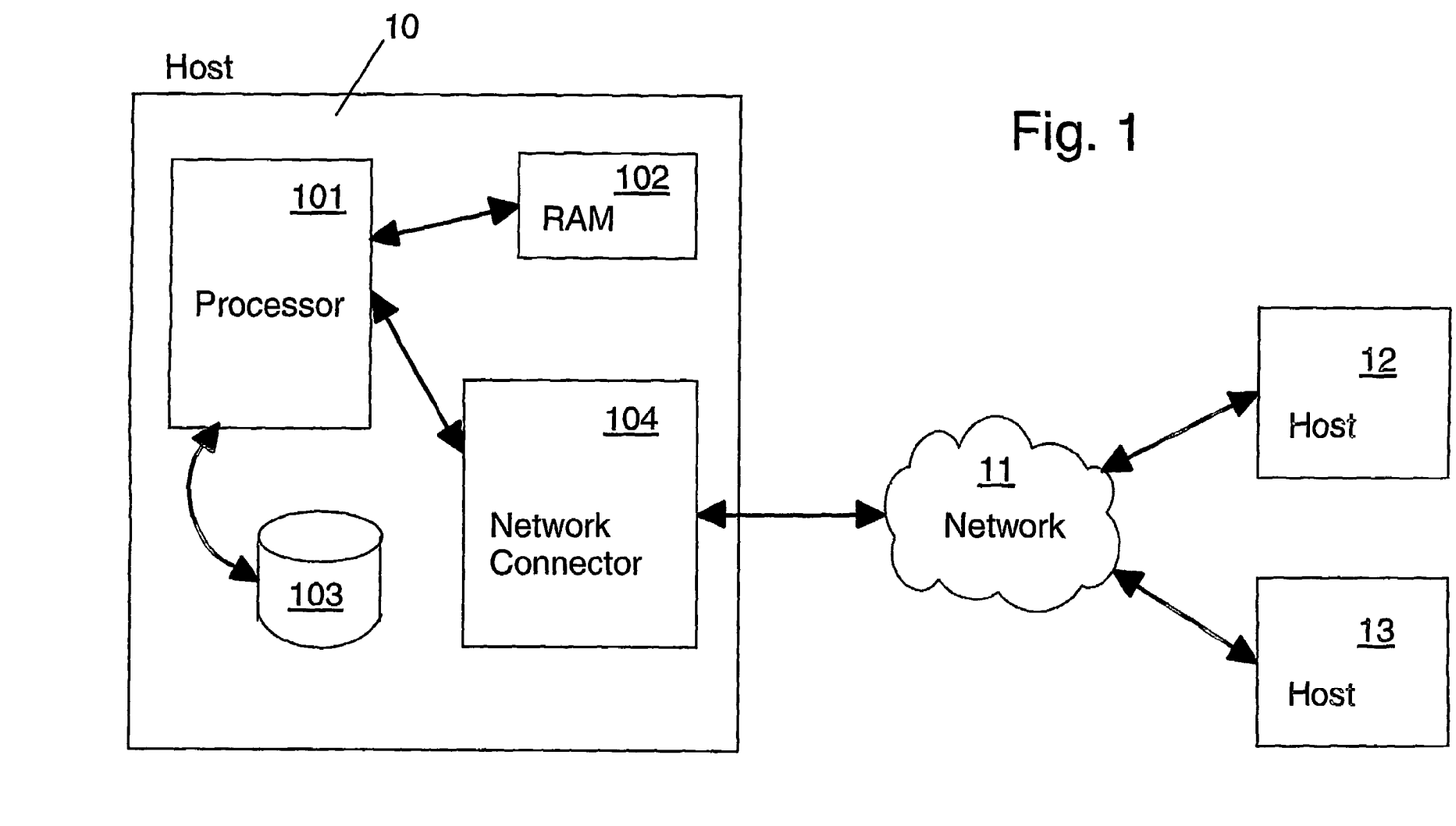
FIG. 1 is a schematic diagram of a data processing environment in which the preferred embodiment of the present invention can be advantageously applied.

FIG. 1 is a schematic diagram of a data processing environment in which the preferred embodiment of the present invention can be advantageously applied. It shows a client/server data processing host 10 connected to other client/server data processing host 12 and 13 via a network 11, which could be, for example, the Internet. A compiler and linkage editor may be installed on any such machine for the compiling and linking of a plurality of assembler source modules into an executable file. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

The preferred embodiment of the present invention proceeds with reference to the IBM z/OS environment. However, other environments provide similar functions and operations. This preferred embodiment considers z/OS assembler programs in which run units are generated by compiling assembler source modules into object decks. According to the prior art the method of putting a copyright notice into an assembler object deck is by inserting, into the assembler source module, a statement of the form:

DC CLn '<<character_string>>'

In this statement "DC CLn" is an assembler instruction to declare a character constant (data entity) of "n" bytes, and "<<character_string>>" is the value of the constant. For example, the following statement declares a 24 byte constant containing the character string of "Copyright IBM Corp. 2003":

DC CL24 'Copyright IBM Corp. 2003'

Such a statement is therefore present in an assembler module and it will further be present after compilation in the compiled form of the module (object deck). However, note that with this technique the character constant is part of the executable section of the module and as a result must be accompanied by other code to allow for this, for example:

B *+64
DC CL64 '<<character_string>>'

This declares a 64 byte character constant but the statement is preceded by a branch statement which branches forward 64 bytes to skip the character constant. As a result when the module is executed the branch statement is executed first and the character string is therefore skipped.

The act of compiling an assembler module does not produce anything directly executable but instead produces an object deck (run unit) which is source for a linkage editor (also known as a binder). The linkage editor is then used to combine a plurality of object decks into a single executable file. Thus, for example, 10 assembler modules may be compiled and linked into one executable file.

The format of an object deck is defined for the linkage editor. In general an object deck comprises a plurality of 80 bytes records which start with a 3 byte key: ESD records name the object deck; TXT records form the executable part of the module; RLD records contain linkage information; and an END record marks the end of the object deck. As a result when the linkage editor combines a plurality of object decks into a single executable file the executable file is made up of a plurality of TXT records processed according to the plurality of RSD records from a plurality of object decks.

Figure 2:
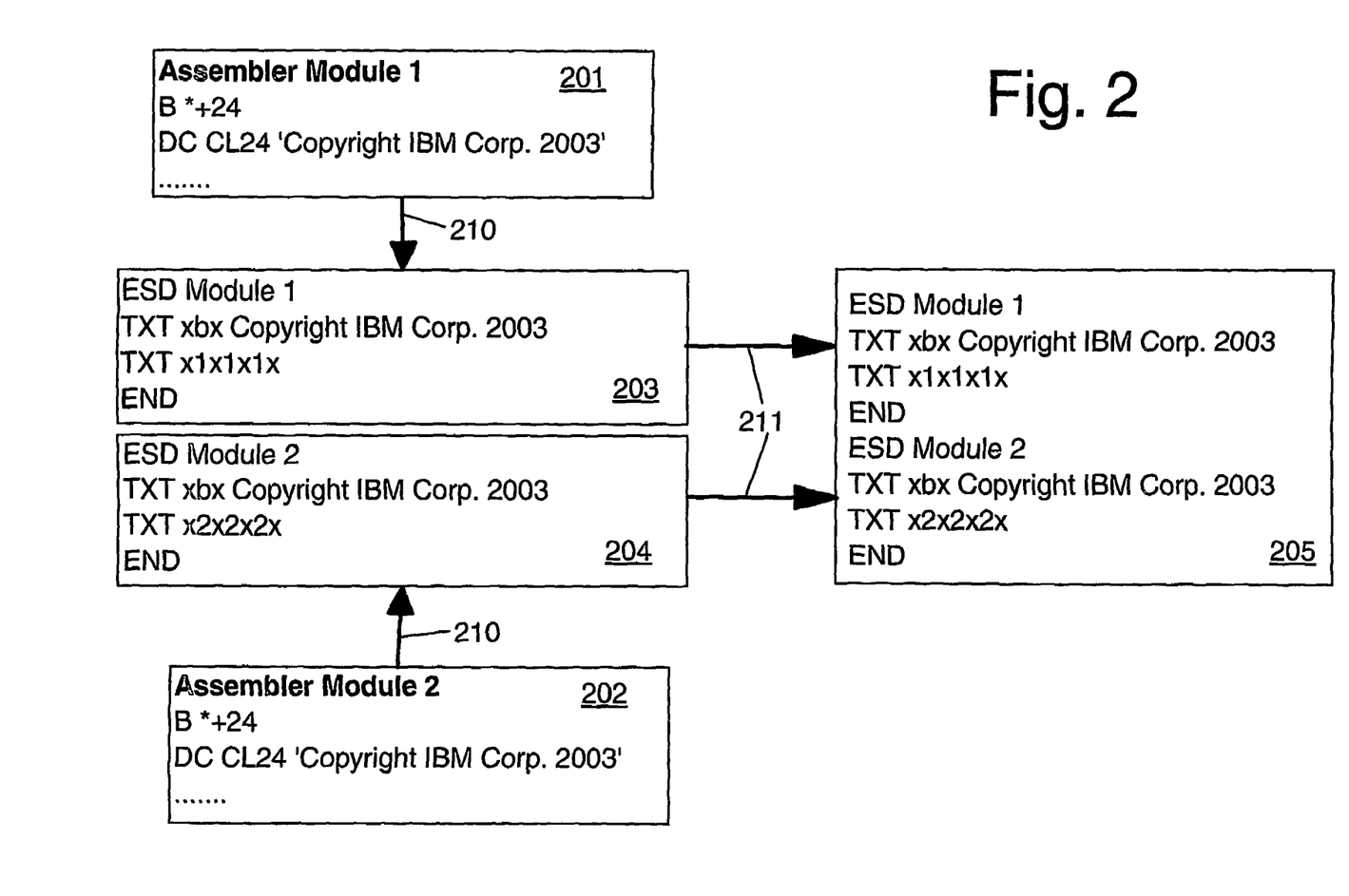
FIG. 2 is a schematic diagram of an example of creating an executable file from a plurality of run units according to the prior art.

An example of the compile and link process according to the prior art is shown schematically in FIG. 2. The figure shows two assembler modules (201, 202) being used to create a single executable file (205) according to the prior art. Both assembler modules (201, 202) include the statements:

B *+24
DC CL24 'Copyright IBM Corp. 2003'

These statements are then followed by any number of statements (shown as " . . . ") which contain the instructions which make up the assembler module. As a result of compilation (210) of these two assembler modules two object decks are produced (203, 204) each of which contain:

1. An ESD record containing the name of the module.
2. A TXT record containing the branch instruction (shown as "xBx" to represent the byte codes which make up this instruction) and the 24 byte character string "Copyright IBM Corp. 2003"
3. A TXT record containing byte codes of the instructions which make up the rest of the module (shown as "x1x1x1x" for module 1 (201), and "x2x2x2x" for module 2 (202)).
4. An END record to mark the end of the module.

Note that in practice an object deck will generally be more complicated, potentially with several ESD records, many TXT records and one or more RLD records. Further the TXT record containing the copyright statement may be preceded and/or followed by additional byte codes.

Once both object decks have been created they are link edited (211) into a single executable file (205) which contains each of the records from the two object decks. As can be seen this results in two copies of the "Copyright IBM Corp. 2003" character string in the executable file where one would suffice. As a result the executable file contains around 27 bytes of unnecessary information (allowing for the branch instruction) and, for example, if the executable file was made up of many object decks each containing the same character string, and further with the character string being longer, the number of unnecessary bytes in the executable file can become very large. In some runtime environments, this merely increases the size of the runtime module with no particular impact. However, in other environments this increase in size can affect performance or can reduce the capacity of the runtime environment to function, for example, if a "short on storage" condition occurs.

Figure 3:
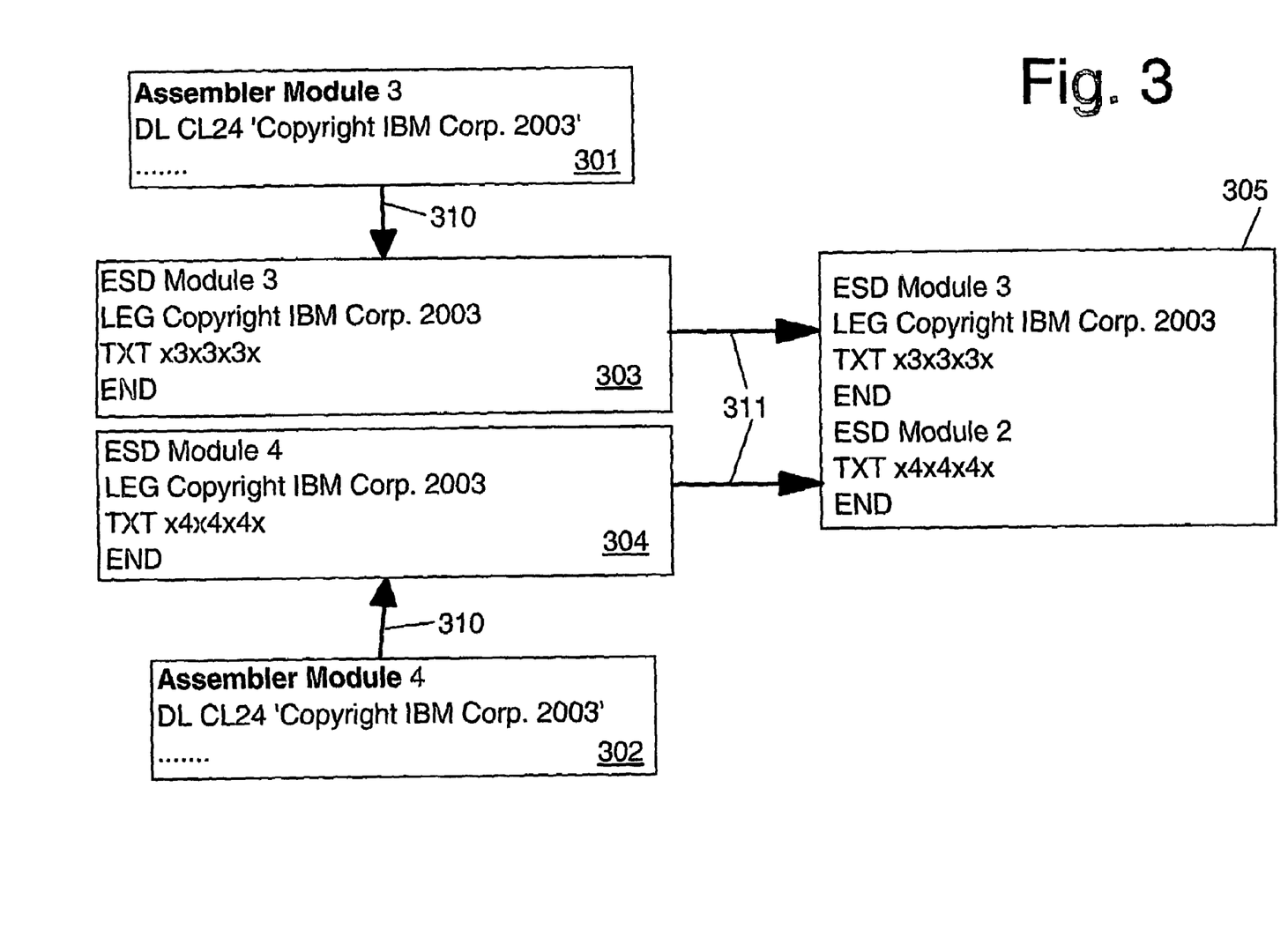
FIG. 3 is a schematic diagram of an example of creating an executable file from a plurality of run units according to a preferred embodiment of the present invention.

FIG. 3 is a schematic diagram of an example of creating an executable file (305) from two assembler modules (301, 302) according to the preferred embodiment of the present invention. Both assembler modules include the statement:

DL CL24 'Copyright IBM Corp. 2003'

"DL" is a new type of assembler instruction which is used in the preferred embodiment to denote a non-executable data entity which need only be included once in any file. This statement is then followed by any number of statements (shown as " . . . ") which contain the executable instructions which make up the assembler module. Note that because DL is used to identify a non-executable data entity there is no need for a branch statement to skip it during execution. When these two assembler modules (301, 302) are compiled (310) two object decks are produced (303, 304) each of which contain:

1. An ESD record containing the name of the module.
2. A new LEG record containing the 24 byte character string "Copyright IBM Corp. 2003" which was specified by the DL instruction.

3. A TXT record containing byte codes of the instructions which make up the executable part of the module (shown as "x3x3x3x" for module 3 (301), and "x4x4x4x" for module 2 (302)).

4. An END record to mark the end of the module.

Note that in practice an object deck will generally be more complicated, potentially with several ESD records, several LEG records, many TXT records, and one or more RLD records (not shown in the figure).

Once both object decks have been created they are link edited (311) into a single executable file (305) which contains records from the two object decks. However, the contents of the LEG records in each of the object decks are checked and any duplicates are only included once. As a result the LEG record from the object deck (303) of Module 3 (301) is present in the executable file whereas the LEG record from the object deck (304) of Module 4 (302), which contains a matching string, is not present in the executable file (305).

Thus the executable file no longer contains duplicate copyright notices and storage is saved. Further when it is considered that the executable file may comprise many object decks each containing the same character string, and further that character string could be longer, the amount of storage saved over the prior art can become very large. This is further an important consideration in storage constrained environments, where such a storage saving may permit more applications to be available in such a constrained environment.

Note that in the preferred embodiment a new DL instruction is used to identify character strings which need only appear once in the executable file. Alternatively an existing instruction could be used and, for example, with a specific value. For example a "DC LEGn" instruction could be used to identify an n character string constant which need only appear once in the executable file, for example:

DC LEG24 "Copyright IBM Corp. 2003"

Further note that in the example of FIG. 3 the LEG record in the executable file 305 is left in the place within the object deck (303) from which it originated. In another embodiment the LEG records can be added to the executable file in a different place such that, for example, all LEG records included from any object deck are placed at the head of the executable file.

Further note that the example of FIG. 3 shows assembler modules with a single DL instruction which results in a single LEG record in the object deck. Optionally there can be more than one DL instruction in the assembler module and a LEG record may be created in the object deck for each of these or by combining two or more DL instructions into a single LEG record. Thus, for example, with reference to FIG. 3, module 4 (302) could contain two DL instructions, for example, one set to "Copyright IBM Corp." and the second containing "2003". Optionally the compiler could combine these into a single LEG record in the object deck (304) containing the string "Copyright IBM Corp. 2003", alternatively it simply adds two LEG records, one for each DL instruction.

Further if the object deck contains a plurality of LEG records, the linkage editor may combine two or more of these before checking for a duplicate. Thus, for example, with reference to FIG. 3, the object deck (304) of module 4 could contain, for example, two LEG records one containing "Copyright IBM Corp." and the second containing "2003". Optionally the linkage editor could combine these into a single LEG record containing "Copyright IBM Corp. 2003" before looking for a duplicate. Alternatively the linkage editor does not combine LEG records before looking for a duplicate.

Whichever method the linkage editor uses to arrive at a LEG record for which a duplicate in the executable file must be checked, there are several options as to how it concludes that a duplicate exists. Optionally it does an exact match comparison with each previously added LEG record, such that a duplicate is only found if an exact match is found. In this case, for example, "IBM Corp." would not match with "Copyright IBM Corp. 2003" because it is not an exact match. Alternatively the linkage editor does a partial match comparison with each previous added LEG record, such that a duplicate is found if part of a previously added record matches with the new record. In this case, for example, "IBM Corp." would match with "Copyright IBM Corp. 2003" as the latter string contains the former. Alternatively wildcard characters are required to achieve a partial match for example "*" being used to denote any string. In this case, for example, "IBM Corp" would not be matched with a LEG record containing "Copyright IBM Corp. 2003", whereas "*IBM Corp.*" would. Further note, if partial checking is used, a previously added LEG record could be removed from the executable file if a subsequently added record contains the string from the previously added record.

Further note that whilst the preferred embodiment discusses adding and removing object decks to an executable file, in some embodiments the executable file could be built in volatile memory such that the executable file is only output once fully built. In this case the concept of adding to and removing from the executable file refers to the adding and removing from the volatile memory used to finally output the executable file.

Further note that whilst the preferred embodiment is discussed in terms of a z/OS assembler module, compilation and link editing, the present invention could equally apply to other languages or environments where two or more files are combined into a single executable file. For example, this will be true of higher level languages, such as C or C++, where the source module is first compiled into an object file and then link edited into an executable file, for example a dynamic link library in the Microsoft Windows environment. Similarly in some environments the compile and link edit step are effectively combined, for example in Java where the class files which are the equivalent to the assembler modules of the preferred embodiment are combined directly into a jar file (the deployment process) which is the equivalent of the executable file of the preferred embodiment. In these environments the method of marking a character string which only needs to be present once in the executable file may be different and given the present invention would be obvious to a person skilled in the art.

Figure 4:
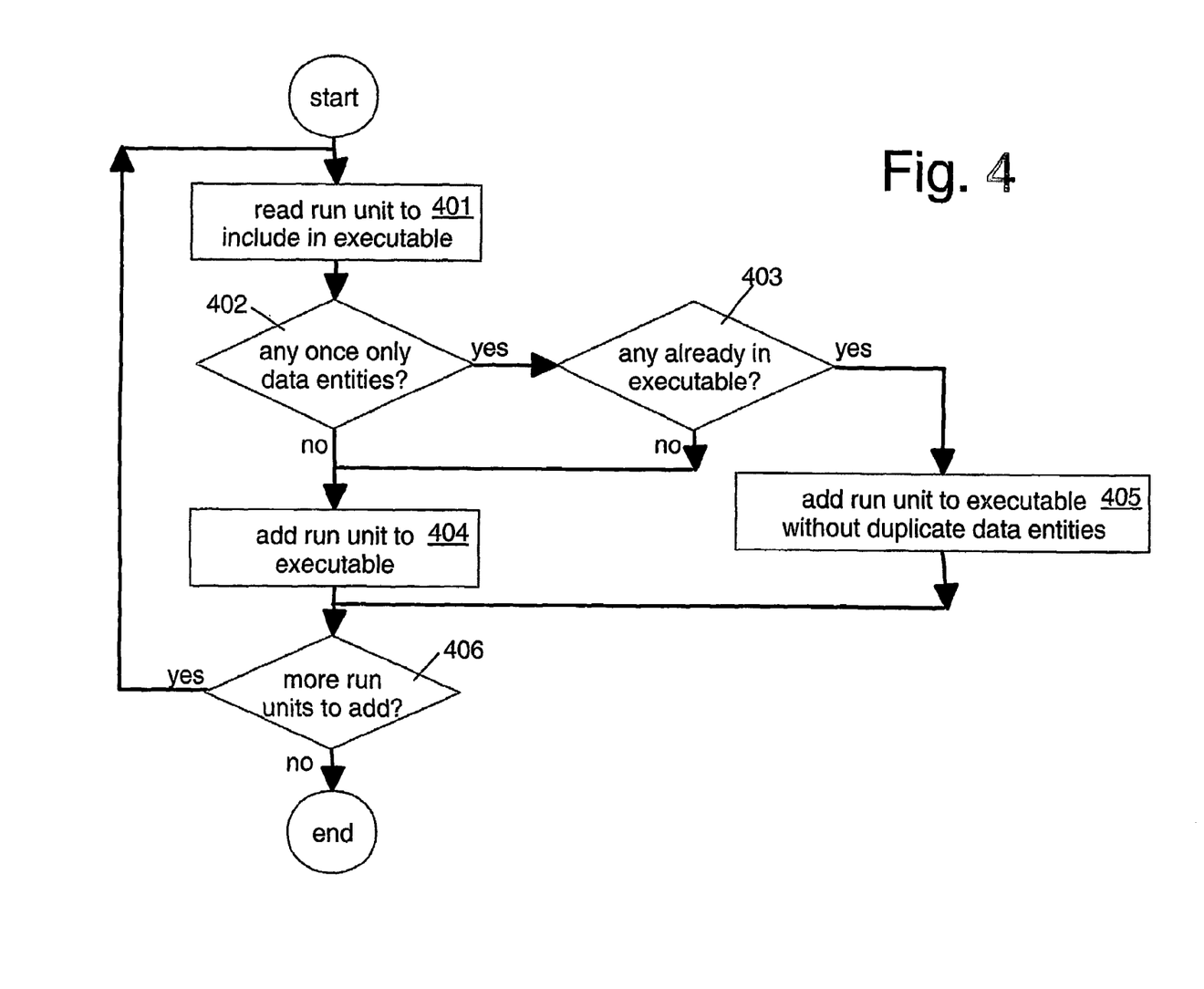
FIG. 4 is a flow chart of a method for creating an executable file from a plurality of run units according to a preferred embodiment of the present invention.

FIG. 4 is a flowchart of a method followed by a linkage editor according to the preferred embodiment of the present invention. At step 401 the linkage editor reads a run unit which is to be included in an executable file. For example, with reference to FIG. 3, this could be the object deck (303) of assembler module 3 (301). At step 402 it checks the run unit for data entities which are indicated as only being required once in the executable file. For example, with reference to FIG. 3 such data entities would be part of a LEG record. If no such data entities exist at step 404 the run unit is added to the executable. However, if such data entries do exist in the run unit, at step 403 a check is made to see if matching data entities are already present in the executable file based on previous inclusion of a different run unit. This check, as previously discussed, may involve an exact or partial match and may also involve combination of one or more data entities. If no duplicate entries are present in the executable file at step 404 the run unit with data entities is added to the executable file. If matching data entities are found at step 403, at step 405 the run unit is added to the executable file but not the data entities for which matching matches were found optionally, when a run unit is added to the executable file, at steps 404 or 405, with associated data entities, the data entities are added to a section in the executable file separate from the rest of the run unit, for example at the head of the executable file.

Note that in another embodiment a duplicate data entity could be added despite already existing in the data file, thus using the method of the preferred embodiment to reduce the number of occurrences of the data entity in the executable file to a smaller number rather than just one. For example, if the executable file is large it may be required to spread duplicate copyright notices throughout the file whilst not including every one included in the run units added to the executable file.

Further note that a skilled person would realise that the method described in FIG. 4 could be implemented in a variety of programming languages, for example, Java, C, or C++ and not just in a linkage editor. Further a skilled person would realise that once implemented the method can be stored in a computer program product comprising or more programs, in source or executable form, on a media, such as floppy disk, CD, and DVD, suitable for loading onto a data processing host and causing the data processing host to carry out the method. Further a skilled person would realise that the method of FIG. 4 could be embodied in hardware apparatus.

Thus the present invention provides a method, apparatus and computer program product for combining a plurality of run units into a single executable file. According the invention each run unit may contain one or more data entities which are designated as being required only once in an executable file. As a result when the executable file is built, if a run unit with a data entity of a given value is to be added to an executable file, if a previous run unit with a data entity with a matching value has previously been added to the executable file, the run unit is added to the executable file but without the data entity.

The invention claimed is:

1. A data processing method for creating an executable file by combining a plurality of run units, the data processing method comprising:
compiling, by an Assembler compiler, a plurality of Assembler modules to produce the plurality of run units, wherein each of the plurality of run units comprises a plurality of records corresponding to a plurality of Assembler instructions of an Assembler module, wherein each record of the plurality of records in a run unit of the plurality of run units begins with a key value identifying a specific type of Assembler instruction, wherein at least two types of Assembler instructions include a character string constant, and wherein at least two of the plurality of Assembler modules include at least one DL Assembler instruction;
identifying, by a linkage editor, a first data entity in a first run unit of the plurality of run units using a first DL Assembler instruction, and a second data entity in a second run unit of the plurality of run units using a second DL Assembler instruction, wherein the first DL Assembler instruction and the second DL Assembler instruction identify character strings which are required to appear only once in the executable file, further comprising:
setting the first data entity to a first value included in the first DL Assembler instruction, and setting the second data entity to a second value included in the second DL Assembler instruction;
responsive to the linkage editor receiving the second run unit of the plurality of run units, comprising the second data entity, to be added the executable file, determining whether the first data entity matches the second data entity, wherein the first run unit of the plurality of run units, comprising the first data entity, was previously added to the executable file;
responsive to a determination that the first data entity matches the second data entity, adding the second run unit of the plurality of run units to the executable file without the second data entity; and
responsive to a determination that the first data entity does not match the second data entity, adding the second run unit of the plurality of run units to the executable file with the second data entity.

2. The data processing method of claim 1, wherein the first data entity matches the second data entity if the first value and second value are identical.

3. The data processing method of claim 1, wherein the first data entity matches the second data entity if the second value partially matches the first value.

4. The data processing method of claim 3, further comprising:
identifying a third data entity using a third DL Assembler instruction that identifies character strings which are required to appear only once in the executable file, wherein the third data entity is set to a third value included in the third DL Assembler instruction;
determining whether the first data entity partially matches the third data entity included in a third run unit of the plurality of run units to be added to the executable file, wherein the first data entity partially matches the third data entity if the third value contains the first value;
responsive to a determination that the first data entity partially matches the third data entity, removing the first data entity from the executable file; and
adding the third run unit of the plurality of run units comprising the third data entity to the executable file.

5. The data processing method of claim 1, wherein identifying a first data entity in a first run unit of the plurality of run units using a first DL Assembler instruction, further comprises:
locating a plurality of data entity records from the plurality of records in the first run unit using each key value of the plurality of records in the first run unit to identify a DL type of Assembler instruction by which each of a plurality of data entities is marked, wherein each record of the plurality of records in the first run unit with a key value that identifies the DL type of Assembler instruction is identified as a data entity record in the plurality of data entity records, and wherein each record of the plurality of records in the first run unit with a key value that does not identify the DL type of Assembler instruction is not identified as a data entity record in the plurality of data entity records; and
creating the first data entity by combining the plurality of data entities.

6. The data processing method of claim 1, wherein identifying a first data entity in a first run unit of the plurality of run units using a first DL Assembler instruction further comprises locating a first record for the first DL Assembler instruction in the first run unit of the plurality of run units using each key value of the plurality of records in the first run unit to identify a DL type of Assembler instruction, wherein the first record contains the first value of the first data entity; and
wherein identifying a second data entity in a second run unit of the plurality of run units using a second DL Assembler instruction further comprises locating a second record for the second DL Assembler instruction in the second run unit of the plurality of run units using each key value of the plurality of records in the second run unit to identify a DL type of Assembler instruction, wherein the second record contains the second value of the second data entity.

7. The data processing method of claim 6, wherein the DL type of Assembler instruction denotes a non-executable data entity which needs only be included once in the executable file.

8. A data processing apparatus for creating an executable file by combining a plurality of run units, the data processing apparatus comprising:
   a memory for storing a plurality of Assembler modules;
   an Assembler compiler for compiling the plurality of Assembler modules to produce the plurality of run units, wherein each of the plurality of run units comprises a plurality of records corresponding to a plurality of Assembler instructions of an Assembler module, wherein each record of the plurality of records in a run unit of the plurality of run units begins with a key value identifying a specific type of Assembler instruction, wherein at least two types of Assembler instructions include a character string constant, and wherein at least two of the plurality of Assembler modules include at least one DL Assembler instruction;
   a linkage editor for identifying a first data entity in a first run unit of the plurality of run units using a first DL Assembler instruction, and a second data entity in a second run unit of the plurality of run units using a second DL Assembler instruction, wherein the first DL Assembler instruction and the second DL Assembler instruction identify character strings which are required to appear only once in the executable file, further comprising:
      the linkage editor for setting the first data entity to a first value included in the first DL Assembler instruction, and setting the second data entity to a second value included in the second DL Assembler instruction;
   the linkage editor for determining whether the first data entity matches the second data entity, wherein the first run unit of the plurality of run units, comprising the first data entity, was previously added to the executable file responsive to the linkage editor receiving the second run unit of the plurality of run units, comprising the second data entity, to be added the executable file;
   the linkage editor for adding the second run unit of the plurality of run units to the executable file without the second data entity responsive to a determination that the first data entity matches the second data entity; and
   the linkage editor for adding the second run unit of the plurality of run units to the executable file with the second data entity responsive to a determination that the first data entity does not match the second data entity.

9. The data processing apparatus of claim 8, wherein the first data entity matches the second data entity if the second value partially matches the first value.

10. The data processing apparatus of claim 9, further comprising the linkage editor for:
    identifying a third data entity using a third DL Assembler instruction that identifies character strings which are required to appear only once in the executable file, wherein the third data entity is set to a third value included in the third DL Assembler instruction;
    determining whether the first data entity partially matches the third data entity included in a third run unit of the plurality of run units to be added to the executable file, wherein the first data entity partially matches the third data entity if the third value contains the first value;
    responsive to a determination that the first data entity partially matches the third data entity, removing the first data entity from the executable file; and
    adding the third run unit of the plurality of run units comprising the third data entity to the executable file.

11. The data processing apparatus of claim 8, wherein identifying a first data entity in a first run unit of the plurality of run units using a first DL Assembler instruction, further comprises the linkage editor for:
    locating a plurality of data entity records from the plurality of records in the first run unit using each key value of the plurality of records in the first run unit to identify a DL type of Assembler instruction by which each of a plurality of data entities is marked, wherein each record of the plurality of records in the first run unit with a key value that identifies the DL type of Assembler instruction is identified as a data entity record in the plurality of data entity records, and wherein each record of the plurality of records in the first run unit with a key value that does not identify the DL type of Assembler instruction is not identified as a data entity record in the plurality of data entity records; and
    creating the first data entity by combining the plurality of data entities.

12. The data processing apparatus of claim 8, wherein identifying a first data entity in a first run unit of the plurality of run units using a first DL Assembler instruction further comprises locating a first record for the first DL Assembler instruction in the first run unit of the plurality of run units using each key value of the plurality of records in the first run unit to identify a DL type of Assembler instruction, wherein the first record contains the first value of the first data entity; and
    wherein identifying a second data entity in a second run unit of the plurality of run units using a second DL Assembler instruction further comprises locating a second record for the second DL Assembler instruction in the second run unit of the plurality of run units using each key value of the plurality of records in the second run unit to identify a DL type of Assembler instruction, wherein the second record contains the second value of the second data entity.

13. The data processing apparatus of claim 12, wherein the DL type of Assembler instruction denotes a non-executable data entity which needs only be included once in the executable file.

14. A computer program product for creating an executable file by combining a plurality of run units, the computer program product comprising:
    a plurality of instructions stored in a memory, the plurality of instructions adapted to cause a processor of a data processing host to perform the steps of:
    compiling, by an Assembler compiler, a plurality of Assembler modules to produce the plurality of run units, wherein each of the plurality of run units comprises a plurality of records corresponding to a plurality of Assembler instructions of an Assembler module, wherein each record of the plurality of records in a run unit of the plurality of run units begins with a key value identifying a specific type of Assembler instruction, wherein at least two types of Assembler instructions include a character string constant, and wherein at least two of the plurality of Assembler modules include at least one DL Assembler instruction;

identifying, by a linkage editor, a first data entity in a first run unit of the plurality of run units using a first DL Assembler instruction, and a second data entity in a second run unit of the plurality of run units using a second DL Assembler instruction, wherein the first DL Assembler instruction and the second DL Assembler instruction identify character strings which are required to appear only once in the executable file, further comprising:

setting the first data entity to a first value included in the first DL Assembler instruction, and setting the second data entity to a second value included in the second DL Assembler instruction;

responsive to the linkage editor receiving the second run unit of the plurality of run units, comprising the second data entity, to be added the executable file, determining whether the first data entity matches the second data entity the first run unit of the plurality of run units, comprising the first data entity, was previously added to the executable file;

responsive to a determination that the first data entity matches the second data entity, adding the second run unit of the plurality of run units to the executable file without the second data entity; and     responsive to a determination that the first data entity does not match the second data entity, adding the second run unit of the plurality of run units to the executable file with the second data entity.

15. The computer program product of claim 14, wherein the first data entity matches the second data entity if the first value and second value are identical.

16. The computer program product of claim 14, wherein the first data entity matches the second data entity if the second value partially matches the first value.

17. The computer program product of claim 16, further comprising the plurality of instructions adapted to cause a processor of a data processing host to perform the steps of:

identifying a third data entity using a third DL Assembler instruction that identifies character strings which are required to appear only once in the executable file, wherein the third data entity is set to a third value included in the third DL Assembler instruction;

determining whether the first data entity partially matches the third data entity included in a third run unit of the plurality of run units to be added to the executable file, wherein the first data entity partially matches the third data entity if the third value contains the first value;

responsive to a determination that the first data entity partially matches the third data entity, removing the first data entity from the executable file; and     adding the third run unit of the plurality of run units comprising the third data entity to the executable file.

18. The computer program product of claim 14, wherein identifying a first data entity in a first run unit of the plurality of run units using a first DL Assembler instruction, further comprises the plurality of instructions adapted to cause the processor of the data processing host to perform steps of:

locating a plurality of data entity records from the plurality of records in the first run unit using each key value of the plurality of records in the first run unit to identify a DL type of Assembler instruction by which each of a plurality of data entities is marked, wherein each record of the plurality of records in the first run unit with a key value that identifies the DL type of Assembler instruction is identified as a data entity record in the plurality of data entity records, and wherein each record of the plurality of records in the first run unit with a key value that does not identify the DL type of Assembler instruction is not identified as a data entity record in the plurality of data entity records; and     creating the first data entity by combining the plurality of data entities.

19. The computer program product of claim 14, wherein identifying a first data entity in a first run unit of the plurality of run units using a first DL Assembler instruction further comprises locating a first record for the first DL Assembler instruction in the first run unit of the plurality of run units using each key value of the plurality of records in the first run unit to identify a DL type of Assembler instruction, wherein the first record contains the first value of the first data entity; and     wherein identifying a second data entity in a second run unit of the plurality of run units using a second DL Assembler instruction further comprises locating a second record for the second DL Assembler instruction in the second run unit of the plurality of run units using each key value of the plurality of records in the second run unit to identify a DL type of Assembler instruction, wherein the second record contains the second value of the second data entity.

20. The computer program product of claim 19, wherein the DL type of Assembler instruction denotes a non-executable data entity which needs only be included once in the executable file.

* * * * *